INVENTOR.
Ora Lee Partonnar.
BY
M. C. Gillham
ATTORNEY.

INVENTOR.
Ora Lee Partonnar.
BY
M. C. Gillham
ATTORNEY.

UNITED STATES PATENT OFFICE.

ORA LEE PARTONNAR, OF KANSAS CITY, MISSOURI.

TURNTABLE-RACK FOR OVENS.

1,350,330.  Specification of Letters Patent.  Patented Aug. 24, 1920.

Application filed August 13, 1919. Serial No. 317,274.

*To all whom it may concern:*

Be it known that I, ORA LEE PARTONNAR, a citizen of the United States, residing at Kansas City, in the county of Jackson and State of Missouri, have invented a new and useful Turntable-Rack for Ovens, of which the following is a specification.

My invention relates to turntable racks for ovens, and the object of my invention is to provide a simple and inexpensive turntable rack for ovens having facility for carrying individual bakers about the interior of the oven to facilitate uniform baking of meats, bread, cake and pastry and to obviate the necessity for reaching into the oven to deposit, move, or remove baking utensils, thereby eliminating the danger of scalds, or burns, usually attending the customary practice of reaching into the oven to accomplish the same purpose.

Figure 1:
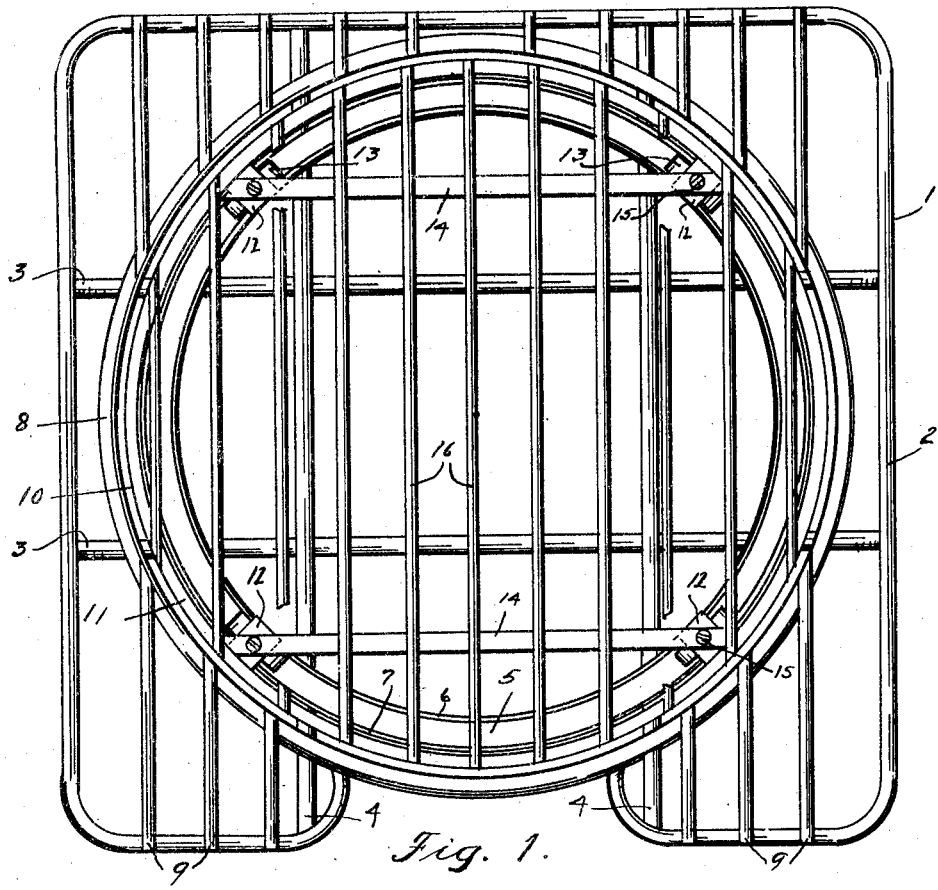
Figure 2:
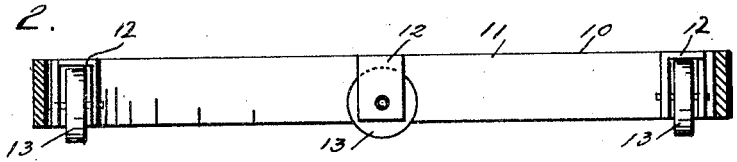
Figure 3:
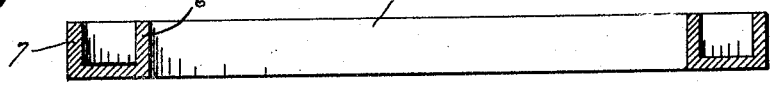
Figure 4:
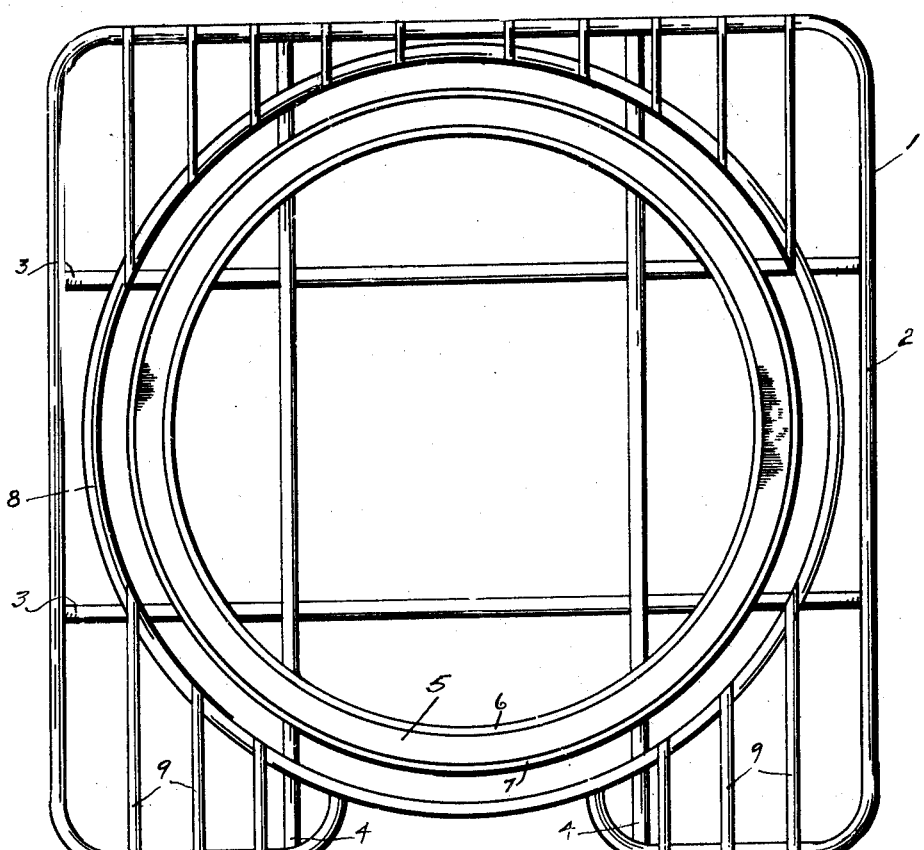
Figure 5:
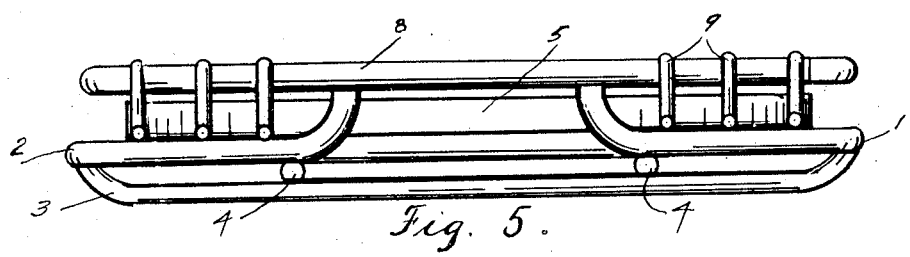

I attain this object and other advantages by means of the device illustrated in the accompanying drawings in which—Figure 1, is a top plan view of an oven rack embodying my invention. Fig. 2, is a cross section through the band of the turn-table. Fig. 3, is a cross section through the channel member or runway for the turntable. Fig. 4, is a top plan view of the rack proper, and Fig. 5, is a front elevation of the same.

Similar numerals of reference refer to corresponding parts throughout the several views.

The numeral 1, is an oven rack which comprises a frame rod 2, which is extended to form either a square or oblong rack, as may be desired. Transversely extending rods 3, and longitudinally extending rods 4, which are spaced apart, are connected between the sides and ends of the frame rod, for the purpose of obtaining greater rigidity for the frame. An annular channel member 5, is secured upon the rods 4, the flanges 6 and 7, thereof extending vertically of the frame, the channel member thus forming a runway or track for a turntable hereinafter described. A ring 8, is arranged to surround the channel member 5, but occupying a slightly elevated position relative thereto. Braces 9, are connected between the end portions of the frame rod 2, and the upper side of the ring 8, the latter being supported at its elevated position by the upturned ends of the rods of the frame, the braces being spaced apart to form grating.

A turntable 10, comprising a band 11, having a plurality of bearing boxes 12, on its inner side and having traction wheels 13, operating in the channel member 5, is movably mounted on the rack proper within the limits of the ring 8. Braces 14, are connected between opposite sides of the band 11, and are fastened on the upper side of the bearing boxes 12, by fasteners 15. A plurality of spaced apart rods 16, are attached on the upper edge of the band 11, and form a grating which is adapted for receiving baking utensils.

The rack proper or supporting member, is arranged to slide on the ordinary oven lugs, not shown here, or any other arrangement for receiving the customary rack. The turntable is removably disposed on the rack, within the ring 8, so that the rack may be used with or without the turntable. The rack is entered in the oven in the usual manner and bakers and pans containing the substance to be baked, is placed on the turntable. If it is desired to move the containers from the front to the back of the oven, or in the reverse, or from one position in the oven to another, the turntable is rotated to move them. It is obvious that with my device it is unnecessary to reach into the oven or to lay hold of the containers during the baking process and, thereby, the attendant is not in danger of receiving accidental scalds and burns, as is likely where the attendant is obliged to reach into the oven and move articles by hand.

The rack proper is preferably made of wire of suitable diameters, although it is understood that the same may be made of cast or pressed metal without departing from the invention.

Having described my invention what I claim is—

A turntable rack for ovens, consisting of a portable shelf member, an annular channeled member mounted on said shelf member and having an inner and outer vertical flange, a circular guard disposed outwardly of and in a plane above said channeled member, a plurality of spaced apart rods connected between the ends of said shelf member and said guard and adapted for holding the latter elevated, and a turn table mounted on said shelf member and within said guard, said turntable comprising an annular vertical flange provided on its inner side with a plurality of pivotally mounted wheels traveling in said channeled member and a plurality of spaced apart parallel bars arranged on the upper edge of the flange and forming with the rods supporting said guard a grating for the rack.

Kansas City, Mo., August 11, 1919.

ORA LEE PARTONNAR.

Witnesses:
 JOHN C. STEARNS,
 ELI NOEL.